(12) United States Patent
Wang et al.

(10) Patent No.: US 11,782,548 B1
(45) Date of Patent: Oct. 10, 2023

(54) SPEED ADAPTED TOUCH DETECTION

(71) Applicant: Apple Inc., Cupertino, CA (US)

(72) Inventors: Lejing Wang, Sunnyvale, CA (US); Benjamin R. Blachnitzky, San Francisco, CA (US); Lilli I. Jonsson, Saratoga, CA (US); Nicolai Georg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/211,516

(22) Filed: Mar. 24, 2021

Related U.S. Application Data

(60) Provisional application No. 62/994,481, filed on Mar. 25, 2020.

(51) Int. Cl.
*G06F 3/01* (2006.01)
*G06F 3/041* (2006.01)
*G06F 3/0488* (2022.01)

(52) U.S. Cl.
CPC ............ *G06F 3/0416* (2013.01); *G06F 3/016* (2013.01); *G06F 3/0488* (2013.01)

(58) Field of Classification Search
CPC ....... G06F 3/016; G06F 3/0416; G06F 3/0488
See application file for complete search history.

(56) References Cited

U.S. PATENT DOCUMENTS

| | | | |
|---|---|---|---|
| 8,781,797 B1 | 7/2014 | Oltman | |
| 9,733,707 B2 | 8/2017 | Kawalkar | |
| 2011/0134079 A1* | 6/2011 | Stark | G06F 3/0488 250/221 |
| 2012/0242851 A1* | 9/2012 | Fintel | H04N 23/64 348/221.1 |
| 2014/0049677 A1* | 2/2014 | Kawaguchi | G06F 3/04842 348/333.01 |
| 2014/0071093 A1* | 3/2014 | Chen | G06F 3/04166 345/175 |
| 2014/0282228 A1 | 9/2014 | Pelissier | |
| 2014/0333539 A1* | 11/2014 | Huang | G06F 3/038 345/163 |
| 2017/0315674 A1* | 11/2017 | Kamamori | G06F 3/048 |
| 2019/0302964 A1* | 10/2019 | Kyosuna | H04N 9/3155 |
| 2020/0356194 A1* | 11/2020 | Kamepalli | G06F 3/03547 |
| 2021/0096737 A1* | 4/2021 | Weksler | G06F 3/04845 |

* cited by examiner

*Primary Examiner* — Ryan A Lubit
(74) *Attorney, Agent, or Firm* — Blank Rome LLP

(57) ABSTRACT

Detecting a touch includes receiving image data of a touching object of a user selecting selectable objects of a target surface, determining a rate of movement of the touching object, in response to determining that the rate of movement satisfies a predetermined threshold, modifying a touch detection parameter for detecting a touch event between the touching object and the target surface, and detecting one or more additional touch events using the modified touch detection parameter.

14 Claims, 8 Drawing Sheets

SPEED ADAPTED TOUCH DETECTION

BACKGROUND

This disclosure relates generally to the field of touch detection, and more specifically to the field of utilizing a determined speed of a finger, hand, or touching object, to dynamically modify a touch detection technique.

Today's electronic devices provide users with many ways to interact with the world around them. For example, users may interact with electronic devices using virtual or physical keyboards, mice, trackballs, joysticks, touch screens, and the like. One way that users often interact with digital information on their device is through a touch screen interface. Touch screen interfaces allow a user to interact with a display surface using a finger, stylus, or other object. A touch sensor recognizes the area touched and provides a response to a user.

Users most often use their fingers to interact with computer user interfaces (UIs) such as by clicking buttons on keyboards or on touch screens. They might interact with UIs with variable frequency. As an example, a user may move quickly from one button to another. As another example, a user might also click buttons at a low frequency and their finger/hand's move at a low speed. What is needed is a touch detection technique that is modified dynamically according to the speed of the user.

SUMMARY

In one embodiment, a method for touch detection is described. The method may include receiving image data of a touching object of a user selecting selectable objects of a target surface, determining a rate of movement of the touching object, in response to determining that the rate of movement satisfies a predetermined threshold, modifying a touch detection parameter for detecting a touch event between the touching object and the target surface, and detecting one or more additional touch events using the modified touch detection parameter.

In another embodiment, the method may be embodied in computer executable program code and stored in a non-transitory storage device. In yet another embodiment, the method may be implemented in an electronic device.

DETAILED DESCRIPTION

Figure 1:
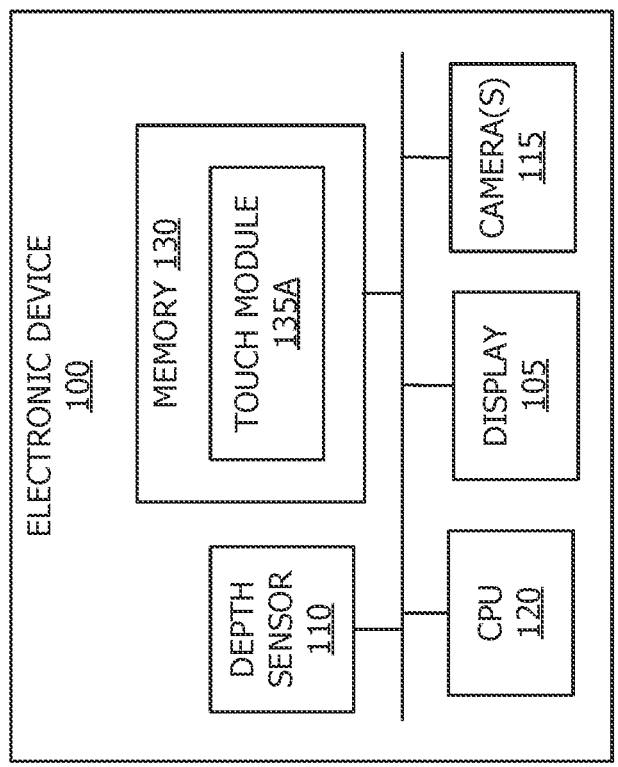
FIG. 1 shows, in block diagram form, a simplified system diagram of two example electronic devices, according to one or more embodiments.

This disclosure is directed to systems, methods, and computer readable media for detecting touch in a physical environment. Touch may be detected, for example, determining when a user touches a physical surface in a physical environment, or by determining when a user touches another part of the user so as to complete a predetermined gesture.

In general, techniques are disclosed to provide a refined technique for identifying when a touch event has occurred using vision-based techniques. Specifically, touch parameters for a touch detection technique may be dynamically modified according to a speed at which a user is moving, for example in relation to a touch surface, or in open space. The touch detection technique typically provides touch data indicating a likelihood of a touch at particular moments over time. By modifying various parameters of the technique, the determination may be made in more efficient, but perhaps less accurate manner, or a less efficient, but perhaps more accurate manner.

In one embodiment, the touch detection could first predict a raw touch data per finger, e.g. touch probability or hover distance (distance between fingertip and touching surface), and then apply threshold(s) on the raw touch data to determine touch or no-touch status or determine make touch event or break touch event. The threshold value could be dynamically changed based on the speed/velocity of the fingertip. For example, the threshold on hover distance could be increased if the finger's speed increases, and the threshold on hover distance decreases if the finger's speed decreases. Another example, the threshold on touch probability may be decreased if the finger's speed increases, and the threshold on touch probability may be increased if the finger's speed decreases. Further, the number of images used for determining the current touch may be decreased if the finger's speed increases, or increased if the finger's speed decreases.

In one or more embodiments, a fingertip might touch a surface for a short time period when it is a fast motion. In this case, a camera might only capture one image of the finger touching surface, or might not actually capture an image of the finger touching the surface. Accordingly, when the touching object, such as a finger, it may be beneficial to modify touch detection parameters for the touch detection technique by increasing a predetermined threshold value for hover distance at which touch is determined, or decreasing a predetermined threshold value for touch probability, as an example.

In one or more embodiments, adjusting or modifying search parameters may include modifying functionality of a camera utilized for vision-based touch detection. As an example, a frame rate of the camera may increase as a speed of a finger or touching object increases, or decrease as the finger's speed decreases. Further, one or more touch detection parameters may be dynamically modified based on a hover distance between a touching object and a target surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images with different points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Referring to FIG. 1, a simplified block diagram of an electronic device 100, in accordance with one or more embodiments of the disclosure. Electronic device 100 may be part of a multifunctional device, such as a mobile phone, tablet computer, personal digital assistant, portable music/video player, wearable device, base station, laptop computer, desktop computer, network device, or any other electronic device. Electronic device 100 may be connected to each other and/or additional devices capable of providing similar or additional functionality across a network, a wired connection, a Bluetooth or other short range connection, among others.

Electronic device 100 may include processor, such as a central processing unit (CPU) 120. Processor 120 may each be a system-on-chip such as those found in mobile devices and include one or more dedicated graphics processing units (GPUs). Further, processor 120 may include multiple processors of the same or different type. Electronic Device 100 may also include a memory 130. Memory 130 may include one or more different types of memory, which may be used for performing device functions in conjunction with processor 120. For example, memory 130 may include cache, ROM, RAM, or any kind of transitory or non-transitory computer readable storage medium capable of storing computer readable code. Memory 130 may store various programming modules, for example for execution by processor 120, including touch detection module 135. Electronic device 100 may also include storage 140. Storage 140 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

In one or more embodiments, electronic device 100 may include other components utilized for vision-based touch detection, such as one or more cameras or camera systems (i.e., more than one camera) 115 and/or other sensors such as depth sensors 110. In one or more embodiments, each of the one or more cameras 115 may be a traditional RGB camera, or a depth camera. Further, the one or more cameras 115 may include a stereo- or other multi-camera system, a time-of-flight camera system, or the like which capture images from which depth information of a scene may be determined.

In one or more embodiments, one or more of electronic device 100 may allow a user to interact with CGR environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes.

In one or more embodiments, the touch module 135 may determine an estimation of whether a touch event has occurred utilizing a touch detection technique. A touch event may indicate a likelihood that contact has been made between a touching object (such as a finger or fingertip) and a surface. The touch module 135 may determine when a touch event occurs, for example, by obtaining depth information for a touching object, such as a finger, and a target surface. As an example, the touch module 135 may receive or obtain depth information from the camera 115, the depth sensor 110, or other sensor, and determine, based on the signal, an estimation that a touch event has occurred. In one or more embodiments, the estimation may be made based on a number of factors, such as by utilizing a predetermined model of a finger or other touching object, utilizing a predetermined or dynamically determined threshold estimation value for determining a touch, etc. Touch module 135 may also estimate a distance between a touching object and a surface.

According to one or more embodiments, various touch detection techniques may be utilized by touch module 135.

The touch detection techniques may include visual based touch detection techniques and various touch detection algorithms. According to one or more embodiments, visual based touch detection techniques may include obtaining raw touch data for a series of frames. The raw touch data may indicate a likelihood of a touch for each frame, or a hover distance of a fingertip to a touching surface for each frame.

The raw touch data (e.g. touch probability or hover distance) could be obtained by a depth based touch detection. For example, depth images of a fingertip touching a real surface may be captured. A fingertip position may be detected in a depth image, and raw touch data may be determined for the fingertip position based on a finger patch containing depth pixels around the detected fingertip position. In one or more embodiments, raw touch data may be determined from the depth pixels by determining a surface in the scene, for example using random sample consensus (RANSAC) plane estimation, and estimating distances to the determined plane for each pixel in the finger patch. Then, distance estimation or classification may be performed to estimate a hover distance, or a likelihood of a touch, based on the distances to the determined plane.

In one embodiment, a touch event may be determined by applying a threshold to the raw touch data (e.g. touch probability or hover distance) from one frame. A break touch event can be determined by applying a break touch threshold to raw touch data (e.g., touch probability or hover distance). The break touch event may indicate when a surface ceases to be touched by the touching object. The positions of touch event and break touch event could be determined in the real surface coordinate, user coordinate system or any other coordinate system. The velocity of fingertip or other touching object could be computed based on fingertip position or position of a touching object or a particular portion of a touching object across different frames. As an example, a difference in the location of the finger in a first and second consecutive frame may be compared and the speed may be calculated by considering a frame rate at which the frames are captured. In one or more embodiments, the velocity may be determined in relation to a speed at which the touching object moves in a variety of directions, such as throughout space, parallel to a target surface, perpendicular to a target surface, and the like.

In one or more embodiments, the various touch detection techniques may be associated with touch detection parameters which make up the touch detection technique. For example, touch detection parameters may include various system settings, such as camera settings by which images are captured to determine whether a touch event has occurred. Camera settings may include, for example, frame rate, resolution, and the like. As another example, touch detection parameters may include components of the touch detection algorithm, such as a gap distance between a touching object and a target surface at which a touch is determined to have occurred, or a touch probability at which it is determined that a touch event has occurred. Further, as another example, the touch detection parameters may include a type of algorithm that is used, such as a flood-fill based algorithm or a deep learning based algorithm. In addition, the touch detection parameter may be associated with characteristics of the target surface. As an example, a size and/or location of a hit box or button size for a particular user interface component may change dynamically.

Although electronic device 100 is depicted as comprising the numerous components described above, in one or more embodiments, the various components may be distributed across multiple devices. Particularly, in one or more embodiments, the touch detection module 135 may be distributed differently or may be present elsewhere in additional systems which may be communicably coupled to the electronic device 100. Thus, the electronic device 100 may not be needed to perform one or more techniques described herein, according to one or more embodiments. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2A:
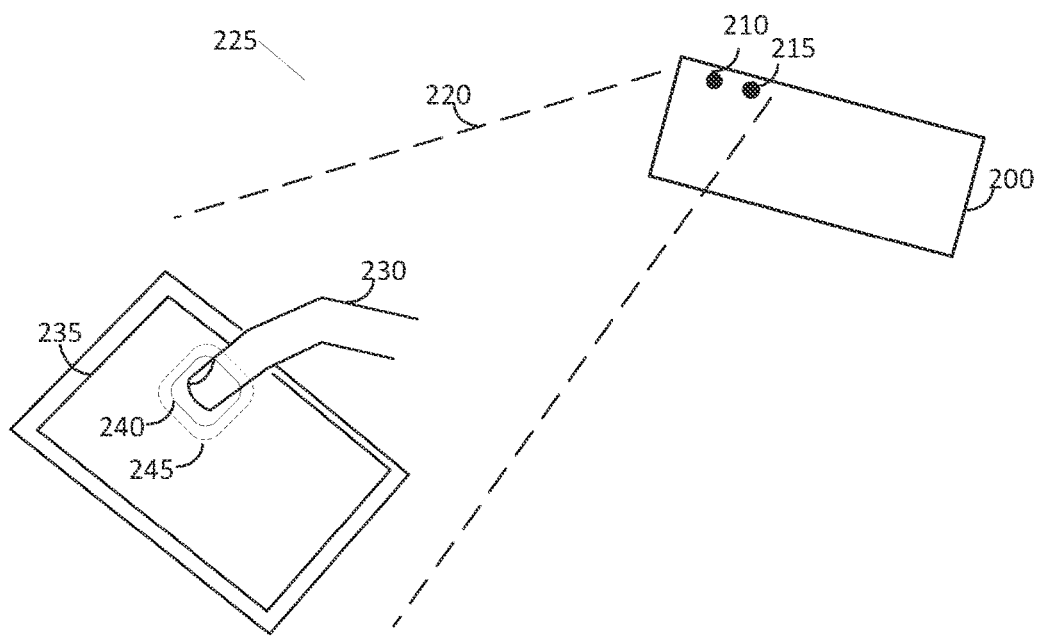
FIG. 2A shows, an example system setup in which touch may be detected, according to one or more embodiments.

FIG. 2A shows, an example system setup 225 in which touch may be detected, according to one or more embodiments. The system includes electronic device 200. Shown on electronic device 200 are camera 215 and/or depth sensor 210. In one or more embodiments, a camera 215 of the electronic device (e.g., camera 115 of electronic device 100) captures an image of an environment including a touch surface 235 and a touching object 230. It should be understood that the term "touching object" refers to an object or a portion of an object which is being tracked or otherwise analyzed to determine whether a touch has occurred, such as a finger or a tool being utilized by a user for touch detection. As such the "touching object" may or may not be touching a surface at any given time.

In order to determine a likelihood of a touch between the touching object 230 and the target surface 235, the touching object 230 and the target surface 235 may be captured by the camera 215 within a view area 220 of the camera 215. The surface 235 may be a flat surface, or may be a curved or irregular surface. According to one or more embodiments, a model of the surface may be registered with the electronic device 200 such that depth information may be utilized to determine a likelihood of a touch based on depth or visual information. In alternative embodiments, the electronic device 200 may determine a likelihood of a touch between the touching object 230 and the surface 235 without relying on a model of the touching object. The target surface may include one or more regions of interest 240, such as an icon, user input component, or selectable item on the target surface. The region of interest 240 may be associated with a hit box 245 for which the region of interest 240 is determined to be selected when the hit box 245 is determined to be touched. As such, the hit box 245 may overlap with the region of interest 240, in whole or in part. Moreover, the hit box 245 for the region of interest may change in size or location, according to one or more embodiments.

Figure 2B:
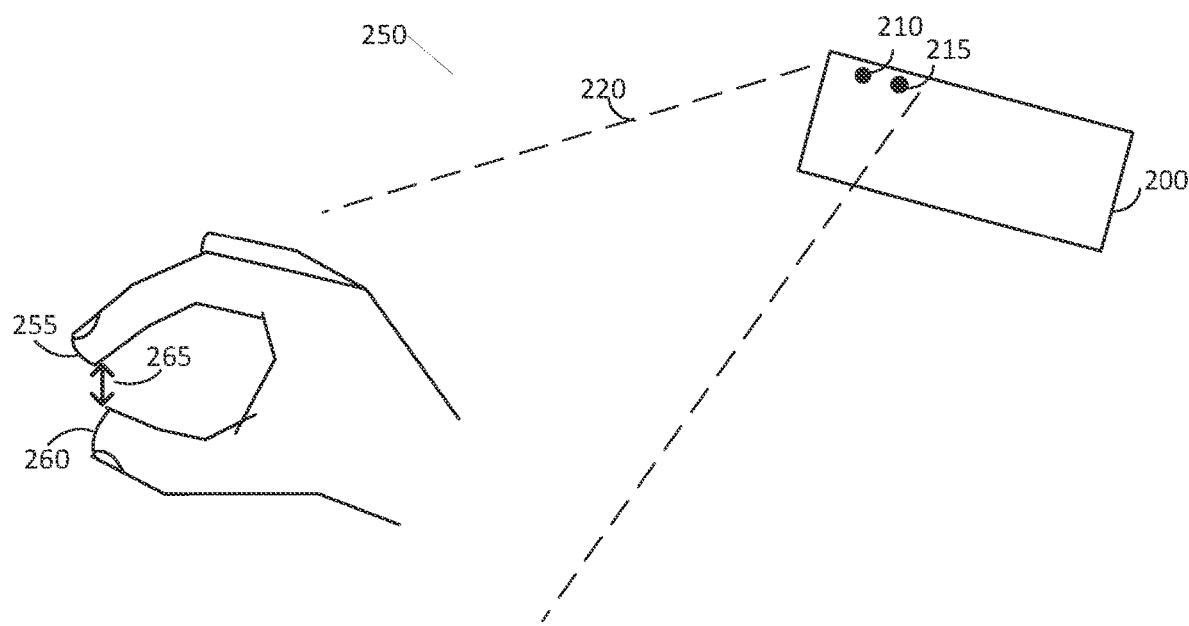
FIG. 2B shows an alternative system setup in which touch may be detected, according to one or more embodiments.

FIG. 2B shows an example system setup 250 in which touch may be detected, according to one or more embodiments. The system includes electronic device 200. Shown on electronic device 200 are camera 215 and/or depth sensor 210. In one or more embodiments, a camera 215 of the electronic device (e.g., camera 115 of electronic device 100) captures an image of an environment including a user's hand which may be monitored to determine if a particular gesture is presented.

For purposes of the example depicted in FIG. 2B, depicts a pinch. As such, electronic device 200 determines the likelihood of a touch between two parts of the user, such as the thumb 260 and index finger 255. For purposes of the description herein, the index finger 255 and the thumb 260 may be considered a touching object and a target surface. In order to determine a likelihood of a touch between the index finger 255 and the thumb 260, the index finger 255 and the thumb 260 may be captured by the camera 215 within a view area 220 of the camera 215.

In order to determine whether a touch event has occurred, a probability of a touch is determined. The probability may be determined based on depth information, such as that obtained from a stereo camera system, a depth sensor, a depth camera, a time-of-flight sensor, and the like, to determine touch data. The touch data may be based on a hover distance 265. The hover distance 265 may be a determined distance between a touching object and a target surface, such as an index finger 255 and a thumb 260 in the case of a pinch gesture. In one or more embodiments, the touch detection module may first detect a fingertip position in a depth image and determine raw touch data for the fingertip based on a finger patch (for example, a portion of the image depicting the tip of the finger) containing depth pixels around the detected fingertip position. In the example of the pinch gesture, the fingertip position may be determined for each of the index finger 255 and the thumb 260.

In one or more embodiments, determining raw touch data from the depth pixels includes first determining a surface based on RANSAC plane estimation, and estimating a distance to the determined plane for each pixel in the finger patch. Then distance regression may be performed to predict a hover distance. Alternatively, binary classification may be performed to predict a likelihood of a touch based on the finger patch of distances to the determined plane.

In one or more embodiments, the raw touch data may include a probability chart that includes a probability of a touch for each frame captured by camera 215. A threshold probability may be utilized to determine whether the frame should be considered a touch. That is, if a probability of a touch satisfies a predetermined threshold, then a touch is determined to have occurred in a particular frame. A touch event is determined to have occurred at the first frame at which a touch is determined to be detected based on the determined probability. In one or more embodiments, the predetermined threshold may be a predetermined value. In one or more embodiments, the probability threshold may be dynamically modified, for example based on learned behavior of a user over time (e.g., a user may benefit from a lower threshold or a higher threshold based on touch behavior). As another example, the probability threshold may be dynamically modified based on a behavior of the user as the user is utilizing the touch detection technique. For example, as a user moves more quickly, a threshold likelihood may be increased to ensure that a touch is detected. As another example, the gap distance used to determine whether a touch has occurred may be increased. This may be beneficial, for example, when a user moves quickly and no particular frame may capture a touch event when one has occurred. Alternatively, if a user is moving more slowly, system resources may be conserved because a touch is more likely to be detected. Other touch detection parameters may be modified that are outside the touch detection algorithm. For example, a frame rate or resolution of the camera 215 may be increased or reduced.

A break touch event can be determined by applying another threshold on touch data (e.g., touch probability or hover distance). The break touch event may indicate the last frame of a series in which the touch object is touching the surface. The positions of make touch and break touch events may be detected by estimating fingertip positions in an image captured by a camera 215. The velocity of fingertip could be computed based on position across different frames, which could be used to dynamically modify touch detection parameters utilized to determine whether a touch event or break touch event has occurred.

Figure 3:
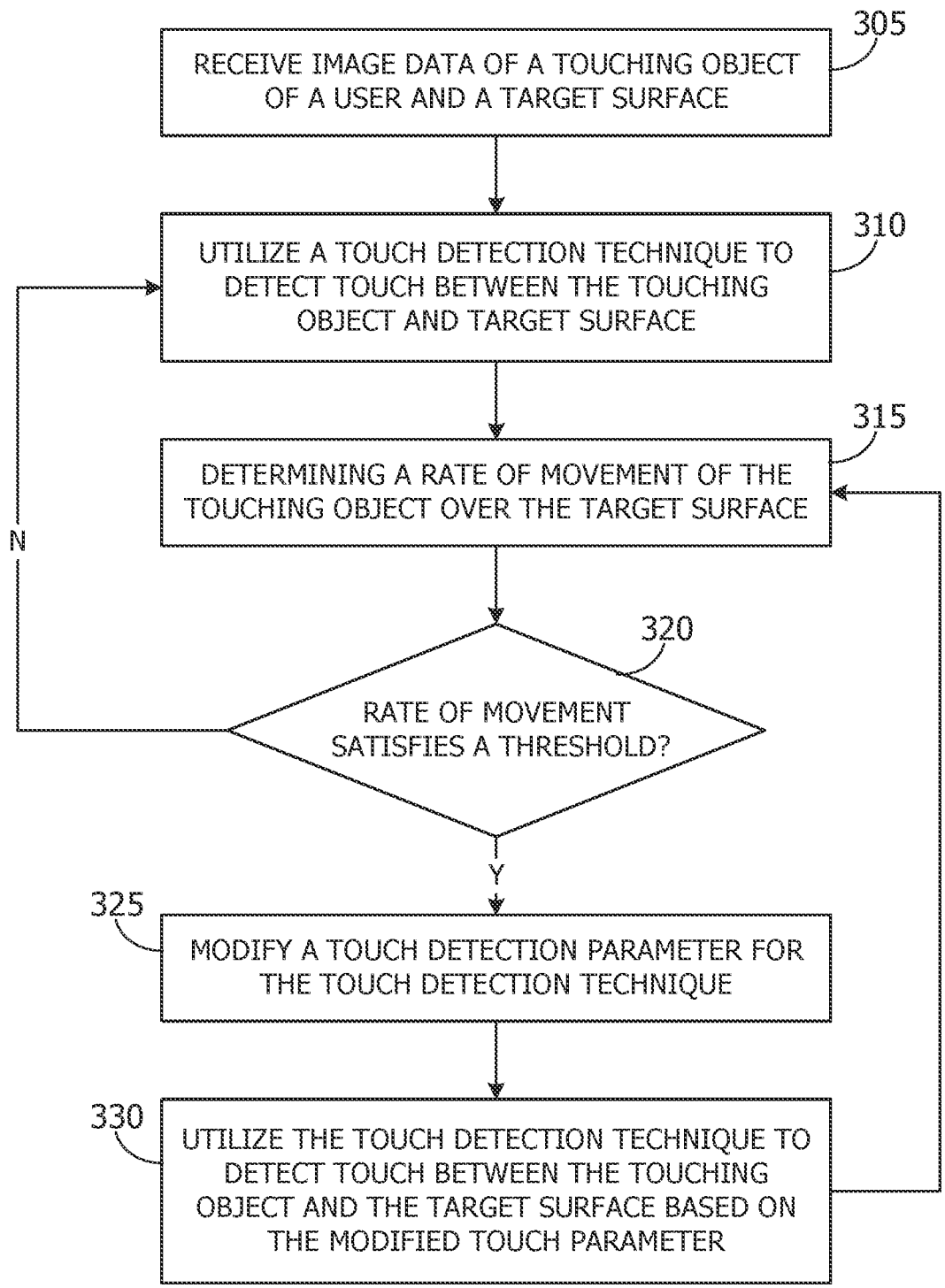
FIG. 3 shows, flow chart form, an example technique for utilizing a dynamic touch detection technique, in accordance with one or more embodiments.

FIG. 3 shows, flow chart form, an example technique for dynamically modifying a touch detection technique, in accordance with one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 305 where the electronic device 100 receives image data of a touching object of a user and a target surface. As described above, the touching object and target surface may both be part of the user, such as a thumb and finger, a finger and palm, a finger and other part of the user's body, and the like. Further, the touching object may be a tool utilized by the user for touch detection. Moreover, the target surface may be an electronic surface such as a display device, or a non-electronic surface. The image data may include, for example, a series of frames that contain depth information and/or image information from which depth information may be determined in order to determine whether a touch event has occurred.

The flowchart continues at 310 where the touch module 135 utilizes a touch detection technique to detect touch between the touching object and the target surface. The touch detection technique may include a touch detection algorithm, such as those described above, in which depth information and/or other visual data is utilized to determine a likelihood that a touch has occurred. The touch detection technique may include a particular touch detection algorithm and may be utilized to detect touch events as well as break touch events.

The flowchart continues at 315 where the touch module 135 determines a rate of movement of the touching object over the target surface. According to one or more embodiments, the rate of movement may be determined as a velocity of the touching object in the environment. In one or more embodiments, the rate of movement may be determined as a velocity of a touching in a parallel direction to the target surface, and/or a velocity of the touching object in a perpendicular direction to the target surface. The rate of movement may be determined, for example, by examining a location of the touching object and/or the target surface over multiple frames of the image data captured for visual based touch detection.

At 320, a determination is made regarding whether the rate of movement satisfies a predetermined threshold. If a determination is made that the rate of movement does not satisfy a predetermined threshold, then the flowchart returns to 310 and the touch module 135 continues to detect touch using the touch detection technique. The predetermined threshold may indicate a rate of movement at which the touching object must meet or exceed, and/or a rate of movement at which the touching object may fall below. That is, in one or more embodiments, multiple predetermined thresholds may be utilized. As an example, if a probability value for a frame is 70% likely to be a touch, and the threshold value is 50%, then the frame may be determined to be a touch frame. Similarly, if the threshold value is 80%, then the frame will be determined to not include a touch. In one or more embodiments, the threshold value may be predetermined, or many vary based on various parameters, such as touch type (e.g., the threshold value may be modified if a particular touch type is detected), human behavior (e.g., the threshold may be modified based on the behavior of the user utilizing the visual touch technique), context (e.g., the threshold may be modified based on contextual information that may affect the ability to detect a likelihood of a touch, such as environmental factors or factors related to the surface and/or the touch object).

If at 320 a determination is made that the rate of movement of the touching object satisfies a predetermined threshold, then the flowchart continues at 325 and one or more touch detection parameters is modified. As will be described below, the touch detection parameters may be modified in a variety of ways. As an example, a probability at which a touch is determined to have occurred may be increased or reduced. For example, if a user moves sufficiently quickly, the probability at which a touch event is determined to have occurred may be reduced to ensure a likelihood that a touch event is more likely to be captured. As an example, if a user's finger is moving quickly through space, a camera is less likely to capture an actual touch event. As such, reducing the probability at which the touch event is determined to have occurred increases a likelihood of accurately detecting a touch event.

The flowchart continues at 330 where the touch module 135 utilizes the touch detection technique based on the modified touch detection parameter to detect a touch event or a break touch event between the touching object at the target surface. The flowchart then continues at 315 where a rate of movement of the touch object is detected over the next series of frames during touch detection.

Figure 4:
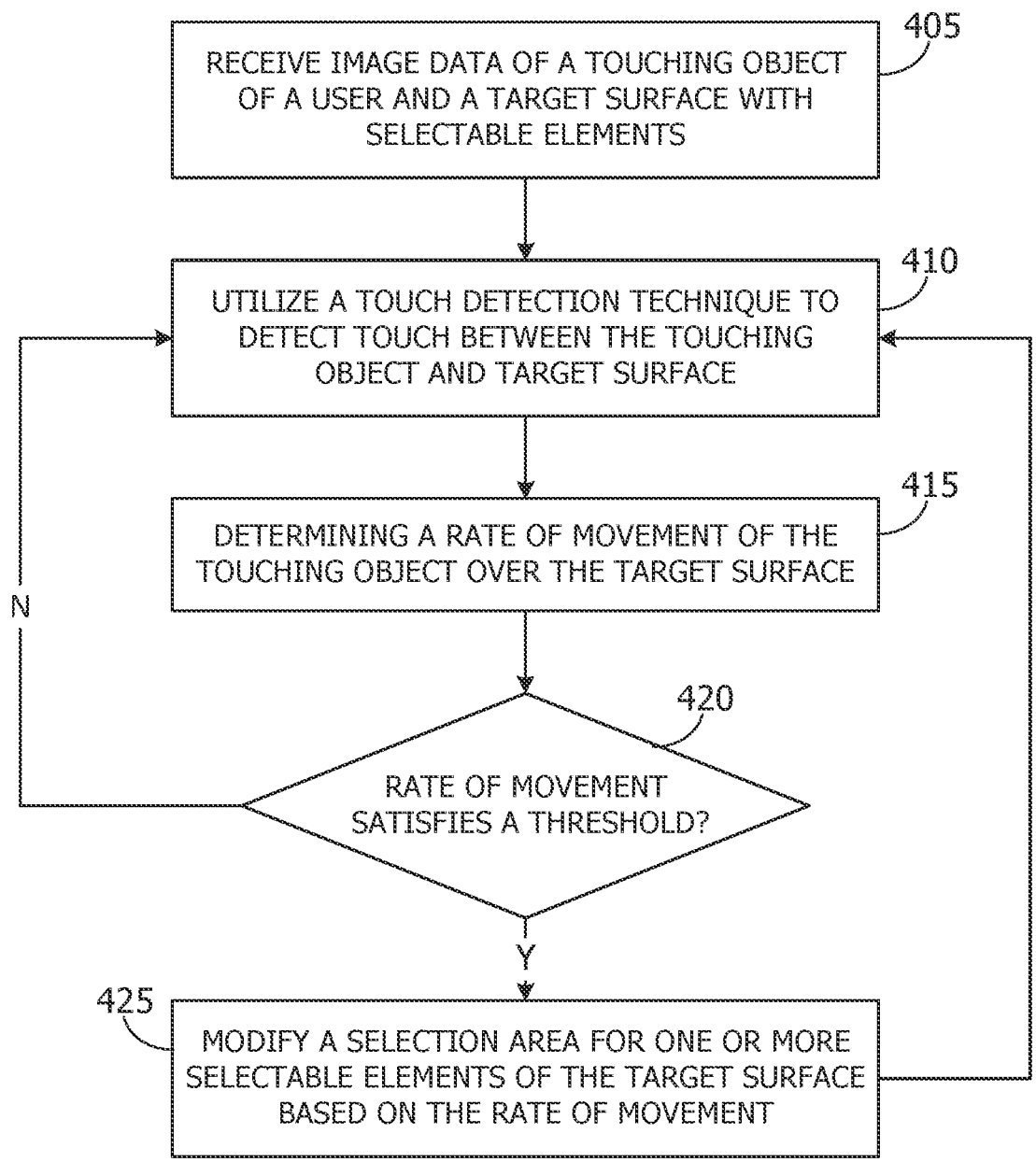
FIG. 4 shows, in flow chart form, an example technique for dynamically modifying a touch selection area, according to one or more embodiments.

FIG. 4 shows, in flowchart form, an example technique for dynamically modifying a touch selection area, according to know more embodiments. In one or more embodiments, the touch parameter that is modified maybe part of a touch detection algorithm, or maybe part of a system set up that is utilized for vision-based touch detection as described herein. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at block 405, where the electronic device 100 receives image data of a touching object of the user and the target surface. The target surface may include selectable elements. As an example, the target surface may be a surface of an electronic device that includes a graphical user interface. As another example, the target surface may be part of the real environment which includes regions of interest that are selectable by a user.

The flowchart continues at block 410, where the touch module 135 utilizes a touch detection technique to detect touch between the touching object and the target surface. Then, at block 415, the touch module 135 determines the rate of movement of the touching object over the target surface. As described above, the rate of movement may be determined as a velocity of the touching object in a parallel direction to the target surface, and/or the velocity of the touching object in a perpendicular direction to the target surface. The rate of movement may be determined, for example, by examining the location of the touching object or the target surface over multiple frames of the image data captured for vision-based touch detection. The flowchart continues at block 420, where a determination is made regarding whether the rate of movement satisfies a predetermined threshold. As described above with respect to FIG. 3, the predetermined threshold may include one or more predetermined threshold. Further, the predetermined threshold may be static or maybe dynamically modified. If at 420, a determination is made that the rate of movement does not satisfy a predetermined threshold, then the flowchart returns to 410 and the touch module 135 continues to the text touch using the touch detection technique. However, if a determination is made at block 420 that the rate of movement satisfies the predetermined threshold, then the flowchart continues to block 425.

At block 425, a selected area, such as a hit box, for one or more selectable elements of the target surface is modified based on the rate of movement. As an example, if the determined rate of movement indicates that the touching object is moving faster than a predetermined threshold, then a hit box for one or more selectable elements made be increased in size. In one or more embodiments, increasing the size of the hit box in response to faster user movements allows the touch module 135 to identify touch events even when a user may be interacting with the target surface in a less precise manner. Similarly, if the rate of movement falls below a threshold, then the user may be determined to be moving slower and thus more precisely. As such, the size of the hit box maybe reduced to avoid false positives. In one or more embodiments, the selectable elements may be part of a display such as display 105 of electronic device 100. Similarly, the hit box may include the region surrounding the selectable element, such as hit box 245 corresponding to selectable element 240 of FIG. 2A. The updated size of the hit box may then be utilized to detect touch events as well as break touch events.

Figure 5:
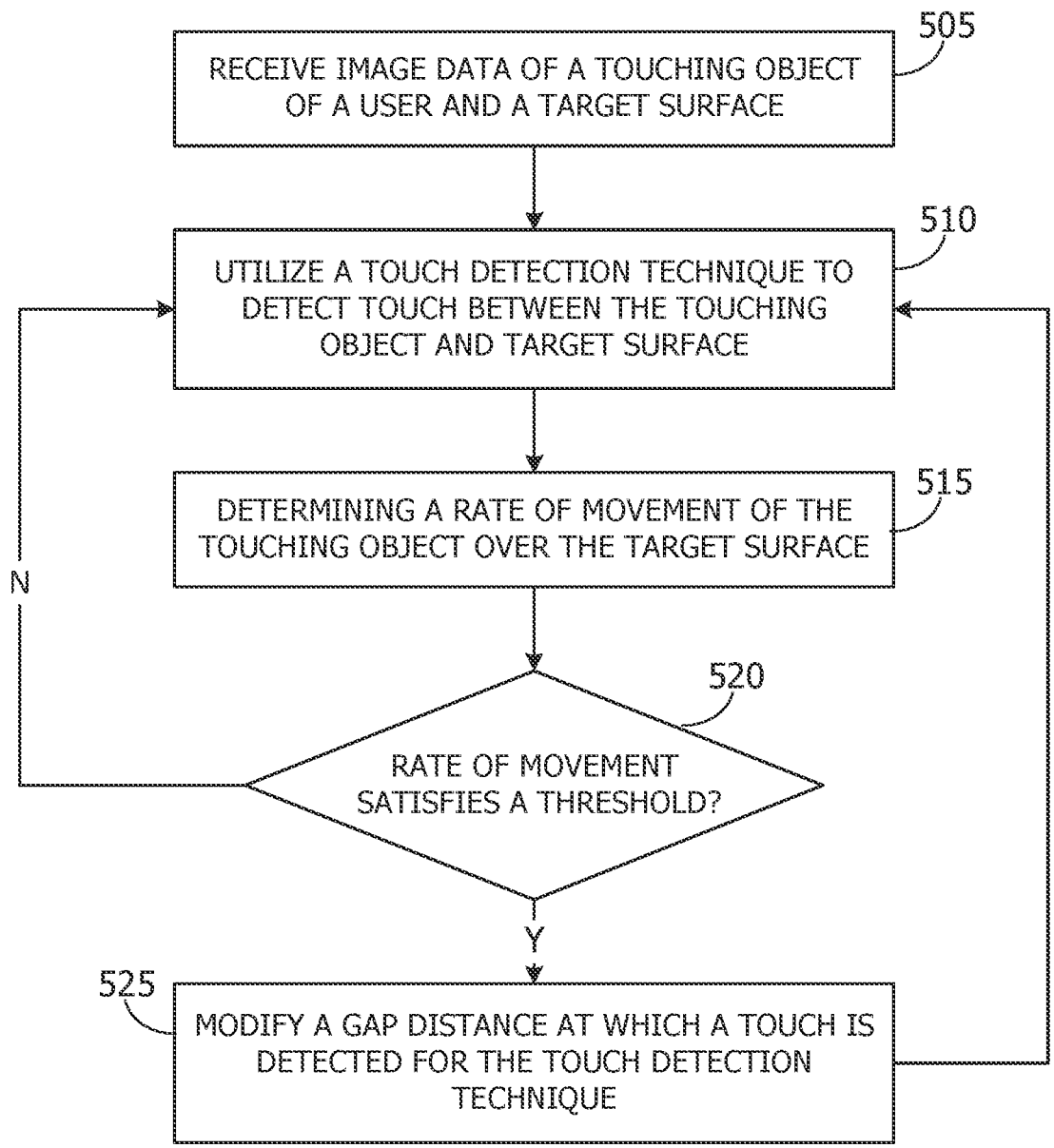
FIG. 5 shows, in flow chart form, an example technique for dynamically modifying a distance at which touch is detected, according to one or more embodiments.

FIG. 5 shows, in flowchart form, an example technique for dynamically modifying a distance at which touch is detected, according to one or more embodiments. For purposes of explanation, the file following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 505 where the electronic device 100 receives image data of a touching object of a user and a target surface. As described above, the touching object and target surface may both be part of the user, such as a thumb and finger, a finger and palm, a finger and other part of the user's body, and the like. Further, the touching object may be a tool utilized by the user for touch detection. Moreover, the target surface may be an electronic surface such as a display device, or a non-electronic surface. The image data may include, for example, a series of frames that contain depth information and/or image information from which depth information may be determined in order to determine whether a touch event has occurred.

The flowchart continues at block 510, where the touch module 135 utilizes a touch detection technique to detect touch between the touching object and the target surface. Then, at block 515, the touch module 135 determines the rate of movement of the touching object over the target surface. As described above, the rate of movement may be determined as a velocity of the touching object in a parallel direction to the target surface, and/or the velocity of the touching object in a perpendicular direction to the target surface. The rate of movement may be determined, for example, by examining the location of the touching object or the target surface over multiple frames of the image data captured for vision-based touch detection. The flowchart continues at block 520, where a determination is made regarding whether the rate of movement satisfies a predetermined threshold. As described above with respect to FIG. 3, the predetermined threshold may include one or more predetermined threshold. Further, the predetermined threshold may be static or maybe dynamically modified. If at 520, a determination is made that the rate of movement does not satisfy a predetermined threshold, then the flowchart returns to 510 and the touch module 135 continues to the text touch using the touch detection technique. However, if a determination is made at block 420 that the rate of movement satisfies the predetermined threshold, then the flowchart continues to block 525.

At block 525, the touch module 135 modifies a gap distance at which a touch is detected for the touch detection technique. In one or more embodiments, the touch detection technique may utilize an algorithm which determines a likelihood of a touch event based in part on a determined gap distance between a touching object and a target surface. For example, a likelihood of a touch may be determined, at least in part, on a captured gap distance between the touching object and the target surface in the image data received at 505. In one or more embodiments, if the rate of movement is sufficiently fast, then a gap distance at which a touch is determined to be detected may be increased. Similarly, if the rate of movement is sufficiently slow, then the gap distance at which a touch is determined to be detected may be decreased. The flowchart continues at 510 and the touch module 135 continues to detect touch based on the updated touch detection parameters, such as the modified gap distance. The modified gap distance may then be utilized to detect touch events as well as break touch events.

Figure 6:
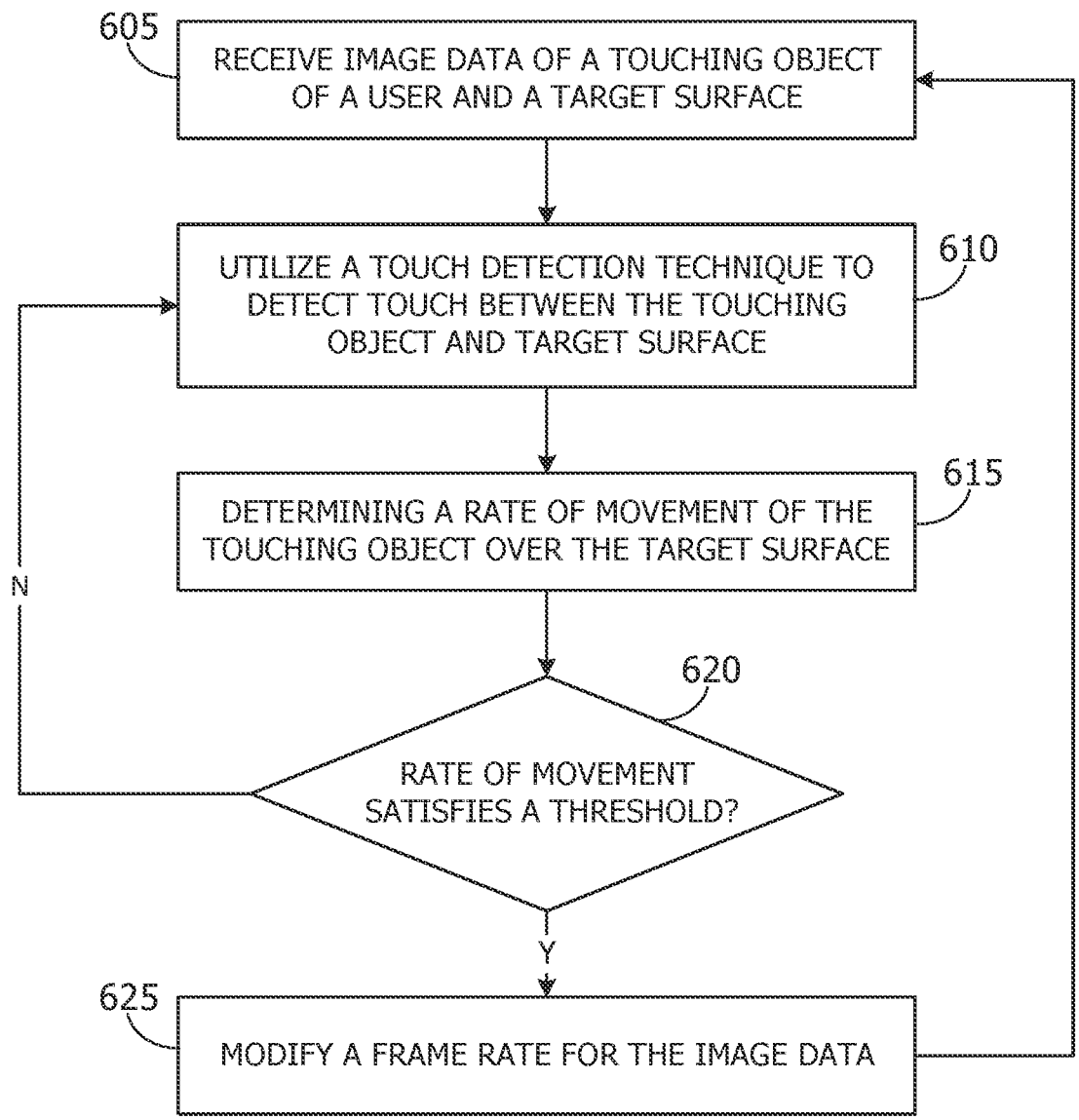
FIG. 6 shows, in flow chart form, an example technique for dynamically modifying a frame rate by which touch is detected, according to one or more embodiments.

FIG. 6 shows, in flow chart form, an example technique for dynamically modifying a frame rate by which touch is detected, according to one or more embodiments. For purposes of explanation, the file following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 605 where the electronic device 100 receives image data of a touching object of a user and a target surface. As described above, the touching object and target surface may both be part of the user, such as a thumb and finger, a finger and palm, a finger and other part of the user's body, and the like. Further, the touching object may be a tool utilized by the user for touch detection. Moreover, the target surface may be an electronic surface such as a display device, or a non-electronic surface. The image data may include, for example, a series of frames that contain depth information and/or image information from which depth information may be determined in order to determine whether a touch event has occurred.

The flowchart continues at block 610, where the touch module 135 utilizes a touch detection technique to detect touch between the touching object and the target surface. Then, at block 615, the touch module 135 determines the rate of movement of the touching object over the target surface. As described above, the rate of movement may be determined as a velocity of the touching object in a parallel direction to the target surface, and/or the velocity of the touching object in a perpendicular direction to the target surface. The rate of movement may be determined, for example, by examining the location of the touching object or the target surface over multiple frames of the image data captured for vision-based touch detection. The flowchart continues at block 620, where a determination is made regarding whether the rate of movement satisfies a predetermined threshold. As described above with respect to FIG. 3, the predetermined threshold may include one or more predetermined threshold. Further, the predetermined threshold may be static or maybe dynamically modified. If at 620, a determination is made that the rate of movement does not satisfy a predetermined threshold, then the flowchart returns to 610 and the touch module 135 continues to the text touch using the touch detection technique. However, if a determination is made at block 620 that the rate of movement satisfies the predetermined threshold, then the flowchart continues to block 625.

At block 625, the electronic device 100 modifies a frame rate for the image data. In one or more embodiments, the touch detection parameters may include system settings, such as camera settings, which affect how the image data is received. As such, in one or more embodiments, a frame rate of the camera may be modified based on a determined rate of movement of the touching object. In one or more embodiments, the touch detection technique may utilize an algorithm which determines a likelihood of a touch event based in part on a determined gap distance between a touching object and a target surface. For example, a likelihood of a touch may be determined, at least in part, on a captured gap distance between the touching object and the target surface in the image data received at 605. In one or more embodiments, if the rate of movement is sufficiently fast, then the images captured may miss a moment at which a touch event occurs. As such, in one or more embodiments, as a rate of movement of the touching object satisfies a threshold, a frame rate at which the images are captured may be increased. Similarly, if the rate of movement is sufficiently slow, then the frame rate at which the images are captured may be decreased. The flowchart continues at 605 and the electronic device 100 continues to detect touch based on the updated touch detection parameters, such as the modified frame rate. The modified frame rate may then be utilized to detect touch events as well as break touch events.

Figure 7:
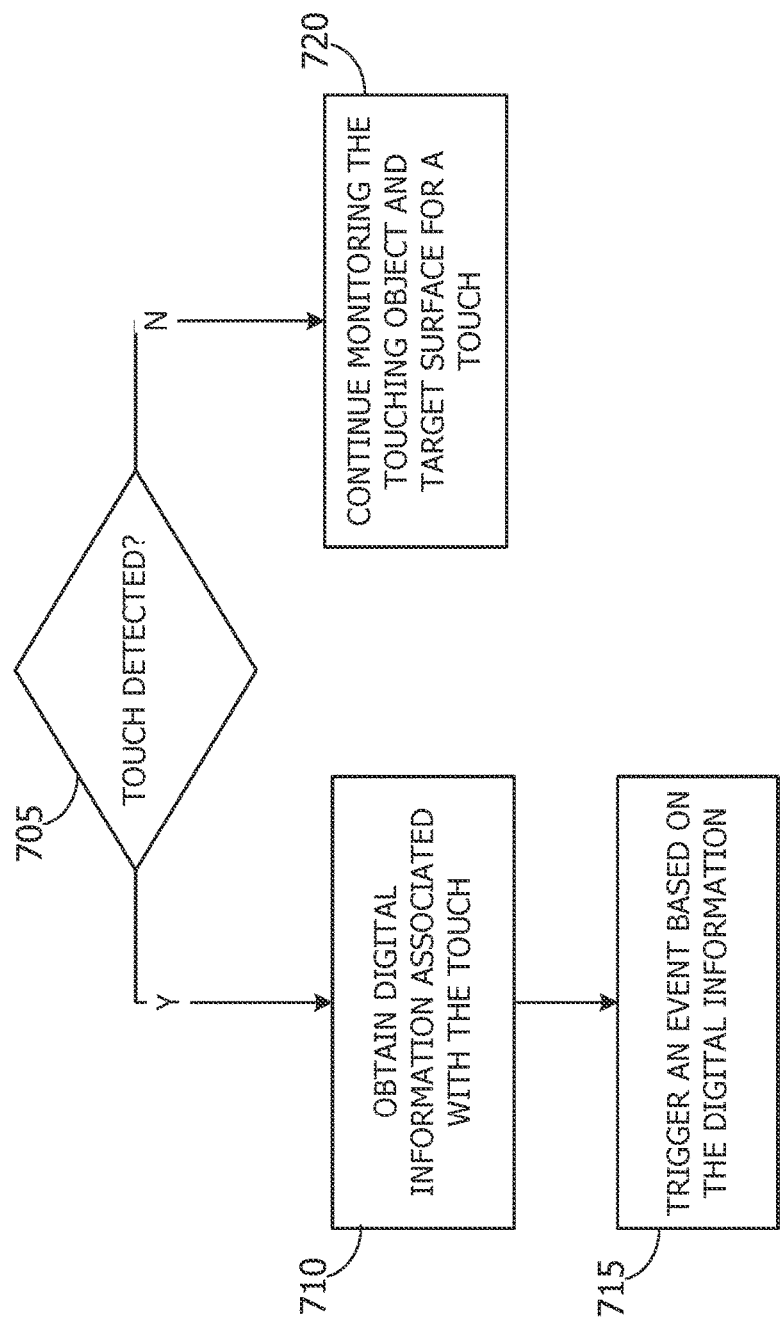
FIG. 7 shows, in flow chart form, an example technique for triggering an event in response to a detected touch, according to one or more embodiments.

FIG. 7 shows, in flow chart form, an example technique for triggering an event in response to a detected touch, according to one or more embodiments. The flowchart begins at 705 where a determination is made regarding whether a touch has been detected. A touch may be detected, for example, as described above with respect to FIGS. 3-6. If a touch is not detected, then the flowchart continues to 720 and the touch module 135 continues to monitor the touching object and the target surface for a touch.

Returning to 705, if a determination is made that a touch is detected, then the flowchart continues at 710 where the touch module obtains digital information associated with a touched portion of the target surface. In one or more embodiments, the digital information may be information related to a visual item at the target location. As another example, the target region may include digital information such as a QR code or other indication which is associated with additional content.

The flowchart continues at 715 where the touch module 135 triggers an event based on the digital information. As an example, the digital information may be computer code utilized to activate an application, access web-based content, and the like. As another example, a notification may be generated and transmitted based on the digital information.

It should be understood that the various steps described above with respect to the flow charts of FIGS. 3-7 may be performed in an alternate order. Further, some of the various steps in the flow charts may be combined in various combinations, according to one or more embodiments.

Figure 8:
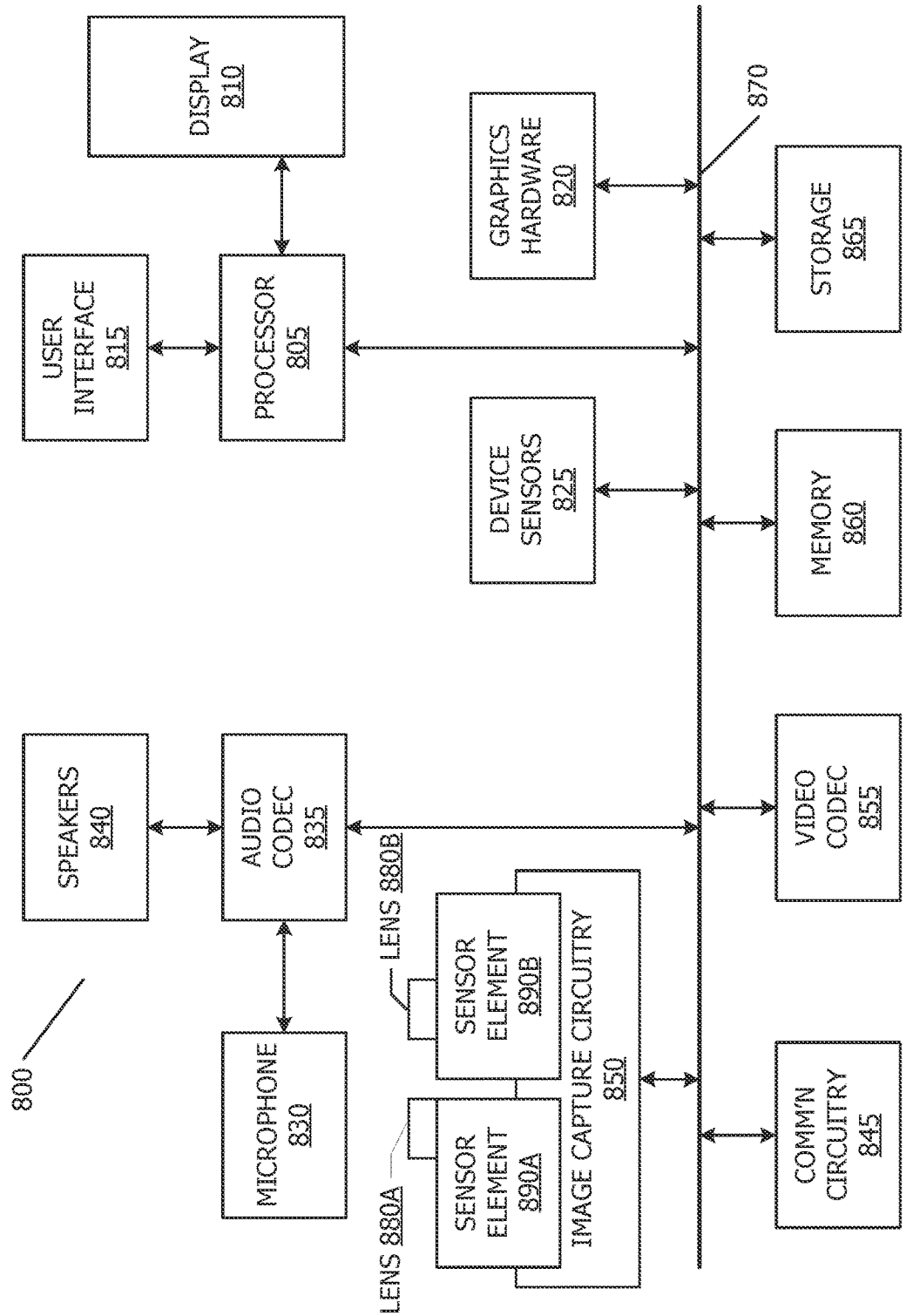
FIG. 8 shows, in block diagram form, a simplified multifunctional device according to one or more embodiments.

Referring now to FIG. 8, a simplified functional block diagram of illustrative multifunction electronic device 800 is shown according to one embodiment. Each of electronic device 100, first wearable device 150 and second wearable device 175 may be a multifunctional electronic device, or may have some or all of the described components of a multifunctional electronic device described herein. Multifunction electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture circuitry 850 (e.g., including camera system) video codec(s) 855 (e.g., in support of digital image capture unit), memory 860, storage device 865, and communications bus 870. Multifunction electronic device 800 may be, for example, a digital camera or a personal electronic device such as a personal digital assistant (PDA), personal music player, mobile telephone, or a tablet computer.

Processor 805 may execute instructions necessary to carry out or control the operation of many functions performed by device 800 (e.g., such as the generation and/or processing of images as disclosed herein). Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include two (or more) lens assemblies 880A and 880B, where each lens assembly may have a separate focal length. For example, lens assembly 880A may have a short focal length relative to the focal length of lens assembly 880B. Each lens assembly may have a separate associated sensor element 890. Alternatively, two or more lens assemblies may share a common sensor element. Image capture circuitry 850 may capture still and/or video images. Output from image capture circuitry 850 may be processed, at least in part, by video codec(s) 855 and/or processor 805 and/or graphics hardware 820, and/or a dedicated image processing unit or pipeline incorporated within circuitry 865. Images so captured may be stored in memory 860 and/or storage 865.

Sensor and camera circuitry 850 may capture still and video images that may be processed in accordance with this disclosure, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   receive image data of a touching object and a target surface, wherein the touching object is situated between a camera capturing the image data and the target surface;
   determine, based on the image data, a velocity of the touching object;
   in response to determining that the velocity of the touching object satisfies a predetermined threshold, modify a threshold hover distance between the touching object and a target surface at which a touch event is determined to have occurred;
   detect one or more additional touch events between the touching object and the target surface using the modified threshold hover distance.

2. The non-transitory computer readable medium of claim 1, wherein the computer readable code to modify the threshold hover distance further comprises computer readable code to reduce or increase a touch probability threshold for determining that a touch event has occurred.

3. The non-transitory computer readable medium of claim 1, wherein the computer readable code to modify the threshold hover distance further comprises computer readable code to reduce or increase a threshold hover distance between the touching object and the target surface for determining that a touch event has occurred.

4. The non-transitory computer readable medium of any of claim 1, wherein the computer readable code to determining a velocity of the touching object further comprises computer readable code to determine a velocity or speed of the touching object in a direction parallel to the target surface.

5. The non-transitory computer readable medium of claim 1, wherein the target surface comprises a touch screen.

6. The non-transitory computer readable medium of claim 1, wherein the touch object comprises a first portion of a body of a user, and wherein the target surface comprises a second portion of the body of the user.

7. A system for detecting touch, comprising:
one or more processors; and
one or more computer readable media comprising computer readable code executable by one or more processors to:
receive image data of a touching object and a target surface, wherein the touching object is situated between a camera capturing the image data and the target surface;
determine, based on the image data, a velocity of the touching object;
in response to determining that the velocity of the touching object satisfies a predetermined threshold, modify a threshold hover distance between the touching object and a target surface at which a touch event is determined to have occurred;
detect one or more additional touch events between the touching object and the target surface using the modified threshold hover distance.

8. The system of claim 7, wherein the computer readable code to modify the threshold hover distance further comprises computer readable code to reduce or increase a touch probability threshold for determining that a touch event has occurred.

9. The system of claim 7, wherein the computer readable code to modify the threshold hover distance further comprises computer readable code to reduce or increase a threshold hover distance between the touching object and the target surface for determining that a touch event has occurred.

10. The system of claim 7, wherein the computer readable code to determining a velocity of the touching object further comprises computer readable code to determine a velocity or speed of the touching object in a direction parallel to the target surface.

11. The system of claim 7, wherein the target surface comprises a touch screen.

12. The system of claim 7, wherein the touch object comprises a first portion of a body of a user, and wherein the target surface comprises a second portion of the body of the user.

13. A method for detecting touch, comprising:
receiving image data of a touching object of a user selecting selectable objects of a target surface, wherein the touching object is situated between a camera capturing the image data and the target surface;
determining, based on the image data, a velocity of the touching object;
in response to determining that the velocity of the touching object satisfies a predetermined threshold, modifying a threshold hover distance between the touching object and a target surface at which a touch event is determined to have occurred; and
detecting one or more additional touch events between the touching object and the target surface using the modified threshold hover distance.

14. The method of claim 13, wherein modifying the threshold hover distance further comprises reducing or increasing a touch probability threshold for determining that a touch event has occurred.

* * * * *